(No Model.) 3 Sheets—Sheet 1.

S. L. GAINES.
COMBINED HEADER AND THRASHER.

No. 297,127. Patented Apr. 22, 1884.

Witnesses:
Thomas Powell
Elihu B. Stowe

Inventor:
Samuel L. Gaines,
By Joshua B. Webster, Atty.

(No Model.)

S. L. GAINES.
COMBINED HEADER AND THRASHER.

No. 297,127. Patented Apr. 22, 1884.

3 Sheets—Sheet 3.

Witnesses:
J. W. Garner
W. S. D. Haines

Inventor,
Samuel L. Gaines,
By Joshua B. Webster Atty.

N. PETERS, Photo-Lithographer, Washington, D. C.

UNITED STATES PATENT OFFICE.

SAMUEL L. GAINES, OF STOCKTON, CALIFORNIA.

COMBINED HEADER AND THRASHER.

SPECIFICATION forming part of Letters Patent No. 297,127, dated April 22, 1884.

Application filed April 26, 1883. (No model.)

*To all whom it may concern:*

Be it known that I, SAMUEL L. GAINES, a citizen of the United States, residing at Stockton, in the county of San Joaquin and State of California, have invented certain new and useful Improvements in Combined Headers and Thrashers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in combined heading and thrashing machines; and it consists, first, in a frame for the machine that is adapted to have the thrashing mechanism placed upon it, and to have the heading and conveying mechanism pivotally secured to it; second, in a conveyer-frame that is pivoted at its rear end to the main frame, and that has a cutting mechanism attached to its front end, and a mechanism for adjusting its front end vertically; third, in the combination of the main frame, pivotal and adjustable conveyer-frame, and a conveyer that is located to the rear of the conveyer in the conveyer-frame, and that extends at right angles thereto;-fourth, in the combination of the main frame, a pivoted and adjustable conveyer-frame, a conveyer located therein, a conveyer located to the rear thereof, and extending at right angles thereto, and a third auxiliary conveyer that is vertically placed in relation to the second conveyer; fifth, in the combination and arrangement of devices that will be more fully set forth hereinafter, and particularly pointed out in the claims.

Figure 1:
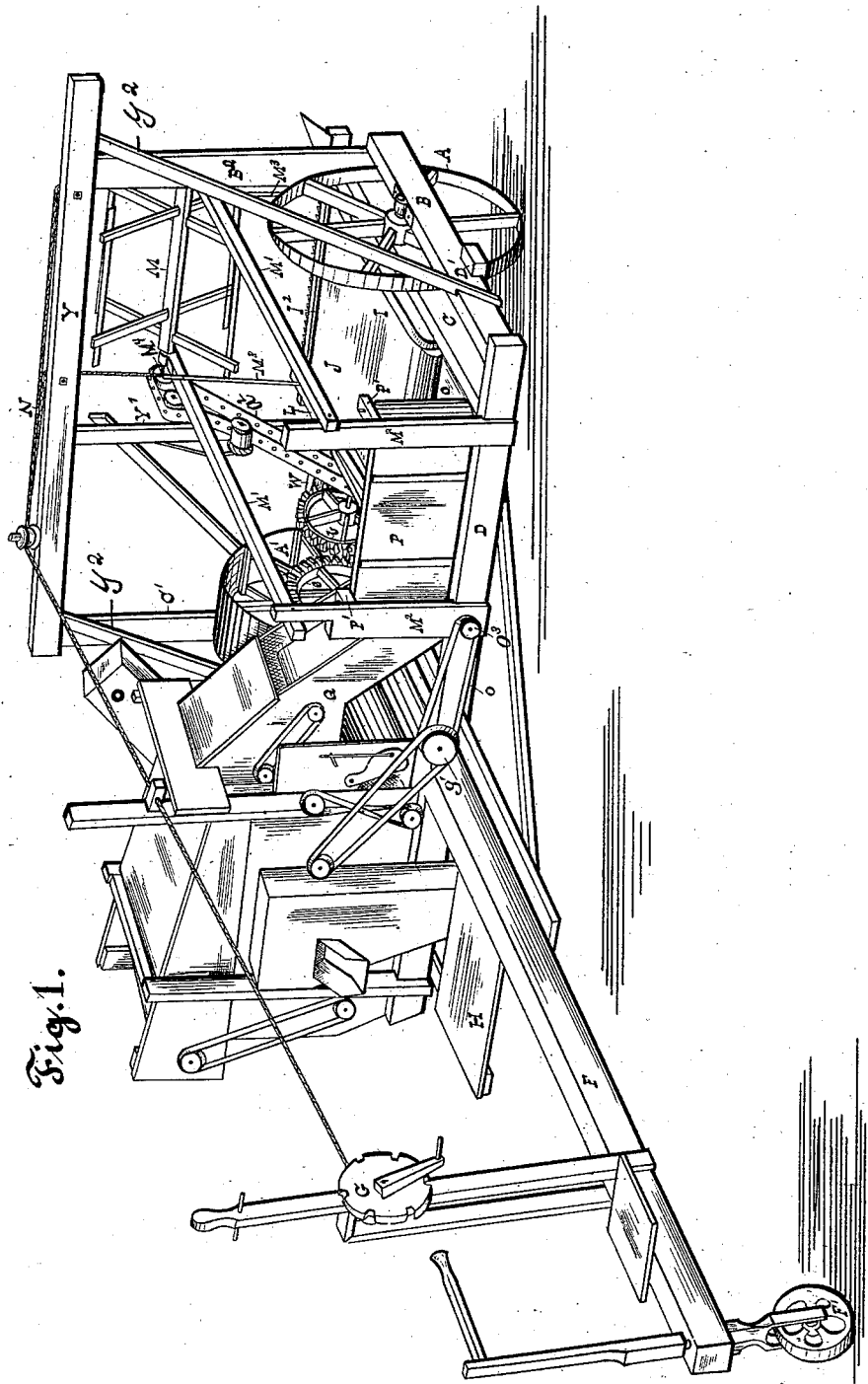
Figure 2:
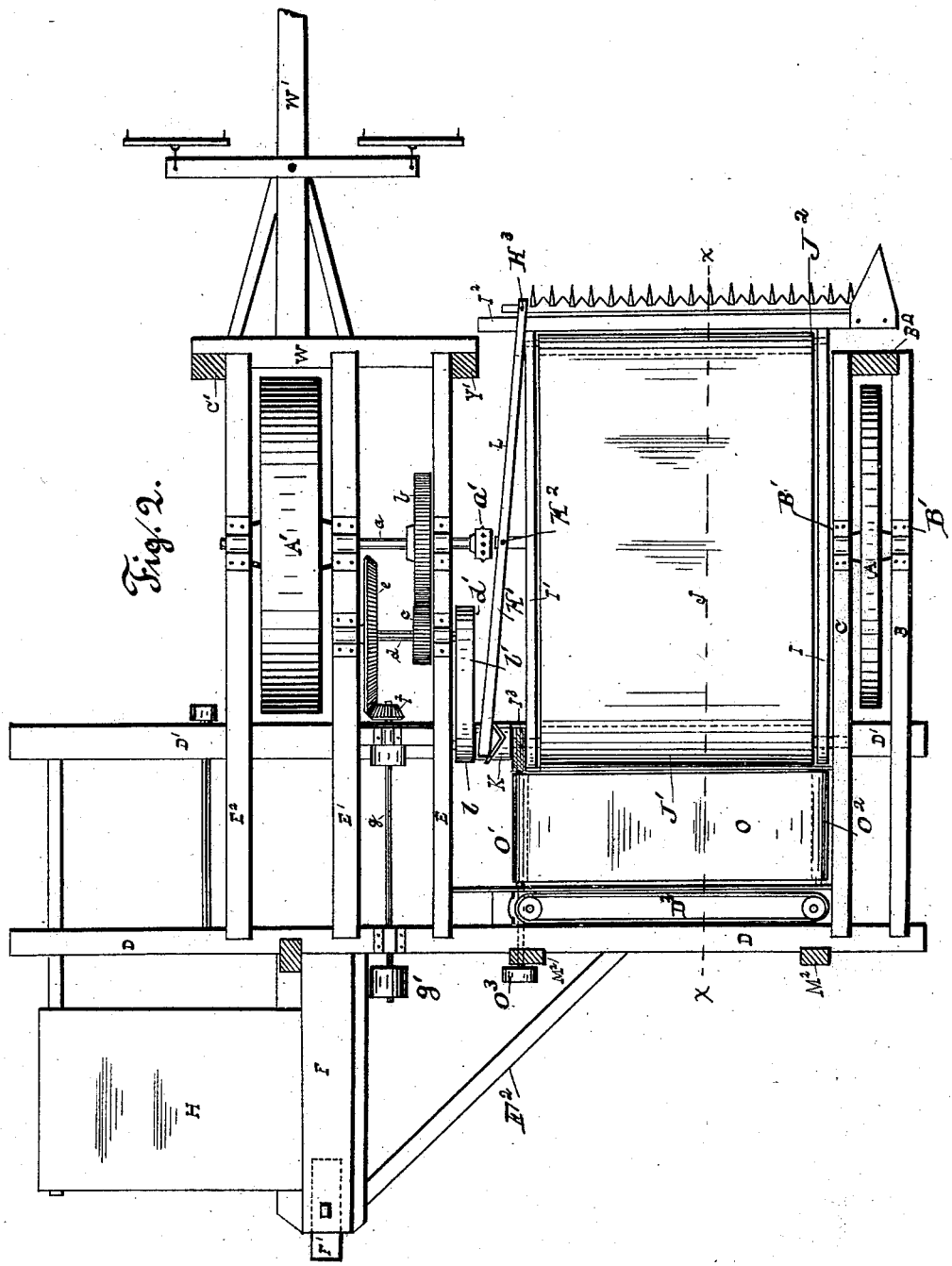
Figure 3:
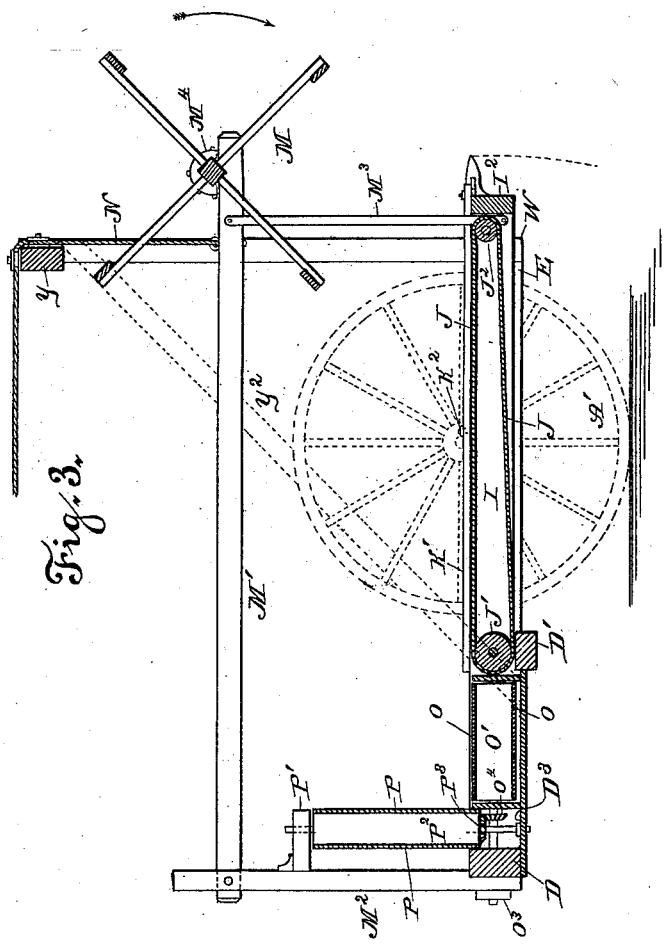

In the accompanying drawings, Figure 1 is a perspective of a machine embodying my invention, showing the cutting, conveying, and thrashing mechanism attached thereto complete. Fig. 2 is a top plan view of the frame of the machine, showing the cutting and conveying mechanism and the driving-gear, the thrashing mechanism being removed, and the vertical extensions of the frame omitted. Fig. 3 is a vertical section taken on the line X X of Fig. 2, showing a portion of the main frame, the pivoted adjustable conveyer-frame, the cutting mechanism, and the conveyers, the other portions of the machine being omitted.

The frame of my machine, upon which the operating devices are supported, consists of the main cross-beams D D', extending the whole width of the machine, and the longitudinal beams B, C, E, E', and E². All of the longitudinal beams are bolted, or otherwise secured, at their rear ends to the cross-beams D.

The beam B is secured near the right extremities of the cross-beams D D', and at a suitable distance from it, toward the center of the machine-frame, is located the beam C. Upon these beams B C are secured the journal-bearings B' for the axle of the wheel A. The beam E is located at the center of the cross-beams, and at equal distances apart, toward the left of the frame, are located the beams E' and E². The front ends of these beams, E, E', and E², are girded together by the beam W.

Secured at their lower ends to the extremities of the beam W are the vertical beams C' and Y'. The vertical beam B² is secured at its lower end between the forward ends of the beams B C, and is of the same height as the vertical beams C' and Y'. The transverse beam Y girds the upper ends of the beams B², C', and Y'. Diagonal bars Y² are secured at their upper ends near the ends of the beam Y, and at their lower ends to the beams B and E², and assist in giving strength to the vertical frame.

To the beam W is attached a pole, W', in any suitable manner.

Secured to the beam D, at a suitable distance from the left end thereof, is the rearwardly-extending beam F, the outer end of which is supported by a wheel, F'.

F² is a brace-bar for strengthening the connection of the beam F to the beam D.

H represents a platform, upon which the operator stands who controls the action of the thrashing mechanism.

J' represents a roller, the shaft of which has projecting ends, which are journaled in the beam C, and in a bearing-block, I³, that is secured upon the upper side of the beam D' at a suitable point.

Pivoted at their rear ends upon the projecting ends of the shaft of the roller J', between the ends of the roller and its bearings, are the beams I and I', which are connected at their forward ends by the cross-beam I², to the front of which beam is secured a cutter-bar of any suitable construction. By this construction of the frame of the cutter-bar, it will be readily understood that its front end will be left free to be adjusted vertically, and thus the cutter-bar can be caused to cut the grain at any desired height from the ground.

J² represents a roller that is journaled between the front ends of the beams I and I'. An endless apron or conveyer, J, passes around and connects the rollers J' and J².

$a$ represents a shaft, which is journaled in suitable bearings, secured to the upper sides of the beams E, E', and E² in a line with the shaft of the wheel A. Rigidly secured to this shaft $a$, between the beams E' and E², is the broad driving-wheel A', that furnishes power to actuate all the machinery upon the frame.

To the inner end of the shaft $a$ is fixed a sprocket-wheel, $a'$, and also to said shaft, near the beam E, is fixed a large spur-wheel, $b$. A shaft, $d$, which has its bearings upon the beams E and E' at a suitable distance to the rear of the shaft $a$, has fixed to it the pinion $c$, which meshes with the spur-wheel $b$. A miter-wheel, $e$, is also fixed to the shaft $d$, and meshes with a miter-pinion, $t$, secured to the forward end of the shaft $g$. This shaft $g$ is journaled in suitable bearings secured to the cross-beams D and D', and has a fixed broad pulley, $g'$, attached to its rear end.

Fixed to the inner end of the shaft of the roller J' is a pulley, $l$, and to the inner end of the shaft $d$ is a similar pulley, $d'$. Around these pulleys is passed the endless belt $l'$. A slotted cam, K, secured to the shaft of the roller J', actuates the inner end of a lever, K', which is fulcrumed at K², and has its outer end pivoted to the reciprocating cutter-bar, as at K³.

O represents a conveyer-apron, which is passed over the rollers O' and O², that are suitably journaled in the frame. This conveyer O extends at right angles to the conveyer J, and is located at the rear thereof, as shown.

To the rear end of the shaft of the roller O' is affixed a pulley, O³. A belt, $o$, connects the pulleys O³ and $g'$.

M² M² represent vertical standards that are secured at their lower ends to the cross-beam D, and have the brackets P' secured to their front sides at a suitable distance above the beam D. A board, D³, is secured to the under side of the beam D, and forms a trough, in which the lower ends of the vertical rollers P² are journaled, which rollers are journaled at their upper ends in the brackets P', and have the endless apron or conveyer P passed around them, which conveyer P extends along parallel with the conveyer O, and is geared to the inner shaft of said conveyer O by means of the miter-wheels O⁴ and P³. (Shown at Fig. 3.) By this construction it will be seen that grain cut by the cutter-bar falls upon the conveyer J, which carries it back to the conveyer O, running at right angles to the rear end thereof, which conveyer O, aided by the vertical parallel conveyer P, carries the grain to the lower end of the inclined elevating-trough Q of the thrashing-machine, that is located on the left of the frame a slight distance to the rear of the driving-wheel A'.

M' M' represent bars that are pivoted at their rear ends to the outer sides of the standards M² M², and extend forward a suitable distance beyond the cutting mechanism. Near their forward ends these bars M' M' are connected to the pivoted beams I and I' by the flat iron rods M³ M³, which rods are pivoted at their upper and lower ends to the said beams and bars. A reel, M, is journaled in the front ends of the bars M', and is rotated by the chain $a²$, that passes over a sprocket-wheel, M⁴, secured to the inner end of its shaft, and over the sprocket-wheel $a'$ of the driving-axle $a$. By this construction it will be apparent that the reel-frame is always kept parallel to the cutting mechanism, and participates in the vertical adjustment thereof.

In order to provide means for accomplishing this adjustment of the cutting and conveying mechanism, I secure the windlass G to a suitable standard upon the forwardly-extending beam F, and from this windlass a rope, N, is passed forward around suitable guide-pulleys upon the beam Y to the front end of the reel-frame, to which the divided outer ends of said rope are secured, as shown clearly at Fig. 1. This construction enables the cutting mechanism to be adjusted to any desired height.

From the pulley $g'$ a belt runs that furnishes power for a thrashing and sacking mechanism, that is adapted to be located upon the frame, as previously stated herein.

The details of construction of said thrashing and sacking mechanism are not shown clearly in the drawings nor set forth here, for the reason that they will be made subject-matter for a separate application for a patent.

The rearwardly-extending beam F is adapted to have secured to it suitable means for attaching horses, and thus convert it into a pushing-pole, should it be desirable to operate the machine in that manner. When so operated, the pole W' will of course be removed. No fuller description of this construction is here rendered necessary, as this will also furnish subject-matter for a separate application for a patent.

In Fig. 1 of the drawings the wheel F' is represented as a steering-wheel, and the beam F is extended a considerable distance to the rear of the frame. When thus constructed, the beam F is adapted as a push-pole. In Fig. 2 the beam F is shown as being considerably shorter, and a draft-pole is attached to the front of the frame.

I do not desire to limit myself to the precise construction and arrangement of parts hereinbefore set forth, as it is obvious that many modifications may be made therein without departing from the spirit of my invention.

Having thus described my invention, I claim—

1. A frame adapted for a combined heading and thrashing machine, said frame consisting of the transverse beams D D', longitudinal beams B C E E' E², rearwardly-extending beam F, and platform H, extending at right angles to the line of draft, substantially as described.

2. A frame composed of the transverse beams D D', longitudinal beams B C E E' E², and rearwardly-extending beam F, in combination with suitable supporting-wheels, and driving-wheel A', mounted in said frame, and connecting-gearing consisting of the axle $a$, shafts $d$ and $g$, gears $b$, $c$, $e$, $t$, $d'$, $l$, and $g'$, cam K, and pivoted connecting-rod K', substantially as set forth.

3. In combination with the main frame of a heading and thrashing machine, the heading and conveying frame I, I', and I², roller J', having a pivoted shaft for said heading and conveying frame, roller J², apron J, cam K, pivoted lever K', a cutter mechanism operated by said lever, and suitable driving and adjusting mechanism, substantially as specified.

4. In combination with the main frame of a heading and thrashing machine, the frame I, I', and I², roller J', having a pivotal shaft, conveyer J, cam K, pivoted lever K', a cutter mechanism operated by said lever, conveyer O, located at the rear of conveyer J, and mechanism for actuating said conveyers and cutting mechanism, substantially as set forth.

5. In combination with the main frame of a heading and thrashing machine, the heading and conveying frame, substantially as described, pivotally secured at its rear end to the main frame, conveyer J, cam K, pivoted lever K', a cutting mechanism operated by said lever, conveyer O, located at the rear of conveyer J, and at right angles thereto, auxiliary conveyer P, and mechanism for operating said conveyer, substantially as shown and described.

6. The combination of a cutter mechanism, conveyer J, conveyer O, located at the rear of conveyer J, and extending at right angles thereto, auxiliary conveyer P, located to one side of conveyer O, and being auxiliary thereto, and suitable operating mechanism, substantially as shown.

7. In combination with the main frame, a conveyer-frame pivoted therein at its rear end, having a cutting mechanism at its front end, and a suitable vertical adjusting mechanism, and a reel-frame pivoted to the main frame and flexibly connected to the conveyer-frame, for the purpose set forth, substantially as described.

8. In combination with the main frame, a conveyer-frame pivoted therein at its rear end, having a cutting mechanism at its front end, and a suitable vertical adjusting mechanism, a reel-frame pivoted to the main frame and flexibly connected to the conveyer-frame, and conveyer O, located at the rear of conveyer J, and extending at right angles thereto, substantially as specified.

9. In combination with the main frame, a conveyer-frame pivoted therein at its rear end, having a cutting mechanism at its front end, and a suitable vertical adjusting mechanism, a reel-frame pivoted to the main frame and flexibly connected to the conveyer-frame, conveyer O, located to the rear of conveyer J, and extending at right angles thereto, and vertical conveyer P, located at one side of the conveyer O, and auxiliary thereto, substantially as set forth.

10. The combination of the main frame, a conveyer-frame pivoted therein at its rear end, a cutting mechanism at the front end of the conveyer-frame, windlass G, mounted on the main frame, and rope N, extending therefrom to the pivoted conveyer-frame for the purpose of vertically adjusting said frame, substantially as shown and described.

In testimony whereof I affix my signature in presence of two witnesses.

SAMUEL L. GAINES.

Witnesses:
JOSHUA B. WEBSTER,
ELIHU B. STOWE.